(12) United States Patent
Zeldin et al.

(10) Patent No.: US 9,356,829 B1
(45) Date of Patent: May 31, 2016

(54) SYSTEM FOR INTERNET PROTOCOL BASED OUTAGE HANDLING

(71) Applicant: Cox Communications, Inc., Atlanta, GA (US)

(72) Inventors: Leon Zeldin, Atlanta, GA (US); Josh Hutchins, Lawrenceville, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 45 days.

(21) Appl. No.: 14/044,839

(22) Filed: Oct. 2, 2013

(51) Int. Cl.
*H04L 12/24* (2006.01)
*H04L 12/26* (2006.01)

(52) U.S. Cl.
CPC ............ *H04L 41/0654* (2013.01); *H04L 43/00* (2013.01)

(58) Field of Classification Search
None
See application file for complete search history.

(56) References Cited

U.S. PATENT DOCUMENTS

| | | | |
|---|---|---|---|
| 5,715,395 A * | 2/1998 | Brabson ............ | H04L 12/5695 709/226 |
| 7,315,541 B1 * | 1/2008 | Housel et al. ................ | 370/392 |
| 2003/0093409 A1 * | 5/2003 | Weil et al. ........................ | 707/3 |
| 2004/0088349 A1 * | 5/2004 | Beck et al. .................... | 709/203 |
| 2006/0224402 A1 * | 10/2006 | Hanna et al. ...................... | 705/1 |
| 2007/0266160 A1 * | 11/2007 | Johnson et al. ............... | 709/226 |
| 2008/0109619 A1 * | 5/2008 | Nakanishi ..................... | 711/159 |
| 2009/0025005 A1 * | 1/2009 | Holzapfel et al. ............ | 718/104 |
| 2011/0302256 A1 * | 12/2011 | Sureshchandra et al. ..... | 709/206 |
| 2014/0172839 A1 * | 6/2014 | Christoph et al. ............ | 707/723 |
| 2014/0257883 A1 * | 9/2014 | Thompson et al. ............... | 705/5 |

* cited by examiner

*Primary Examiner* — Hong Cho
(74) *Attorney, Agent, or Firm* — Merchant & Gould P.C.

(57) ABSTRACT

An internet protocol (IP)-based outage handling system. The outage handling system collects information about the impact of selected unavailable network resources on users accessing the network of an internet service provider (ISP). The outage handling system stores information identifying the unavailable network resource and monitors network traffic on the managed network for requests to access the unavailable network resource. The outage handling system intercepts requests to access the unavailable network resource and logs information associated with the request. The logged information may be used to track the total number of requests and analyze the actual impact of the outage. The outage handling system optionally collects additional voluntarily provided information that may be used to notify the user when the resource is available and/or to provide compensation for the access interruption caused by the outage.

20 Claims, 10 Drawing Sheets

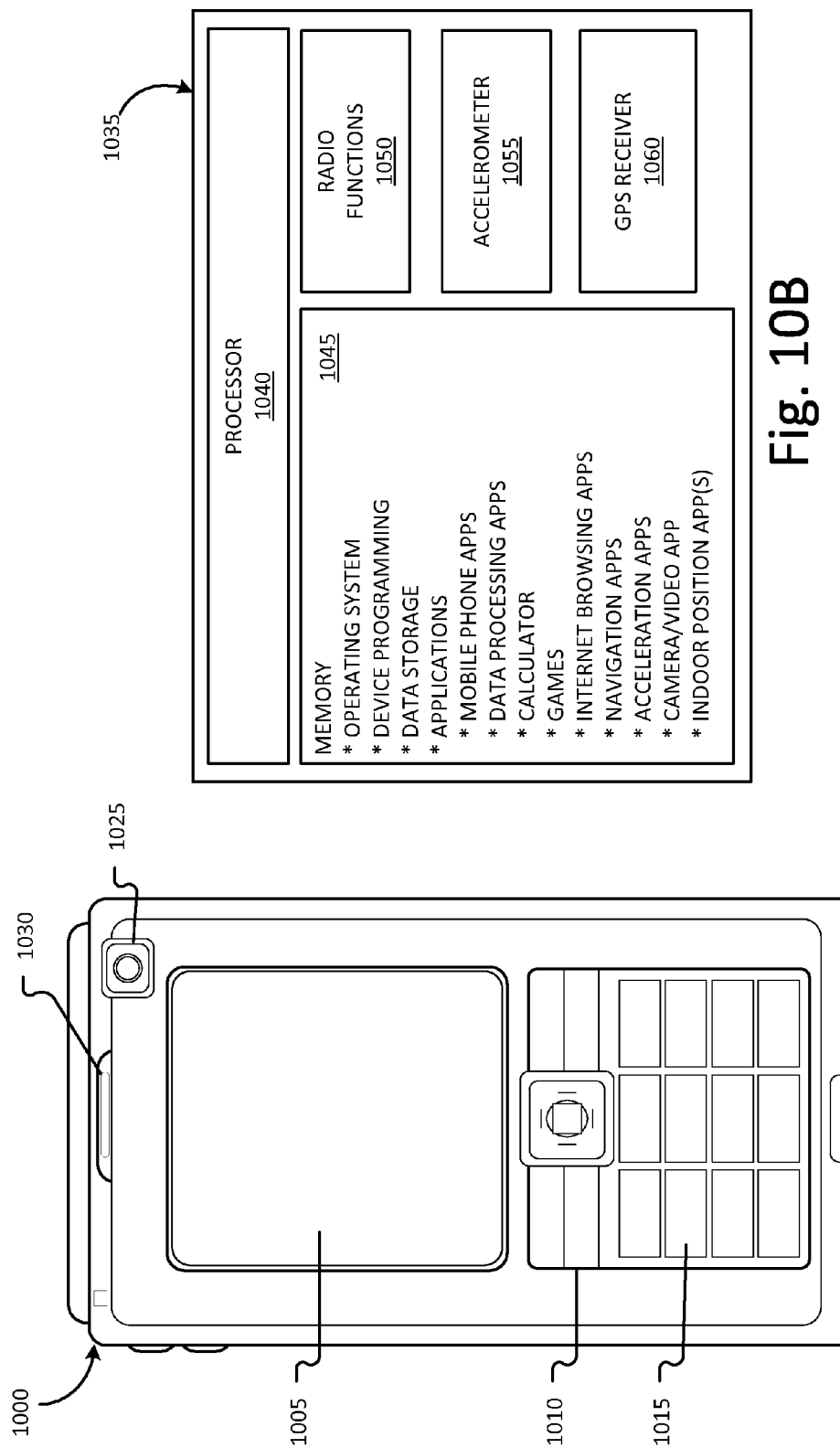

SYSTEM FOR INTERNET PROTOCOL BASED OUTAGE HANDLING

BACKGROUND

Outages of Internet and local area network resources (e.g., websites or email services) are inevitable occurrences. Resource outages may be the planned or unplanned result of maintenance or failure of the host device or the software. The Domain Name System (DNS) provides limited handling of resource outages. When a resource is unavailable, users may simply receive a generic error message via the user agent (e.g., the web browser or email application) or, in some cases, the user agent may be redirected to a search page intended to help the user locate the unavailable network resource.

Most internet service providers have DNS servers providing internet protocol (IP) address lookup for use by their customers. However, customers of one internet service provider that are roaming on another internet service provider's network may utilize the DNS servers of the internet service provider that customer is using to access the Internet. For example, a customer accessing resources associated with their home internet service provider from work will typically be using the DNS servers associated with their work internet service provider. For example, roaming users may be utilizing the DNS servers of the internet service provider of whom the user is a customer. Further, some users may have systems using statically, rather than dynamically, configured DNS servers. For example, a customer might choose to use an alternative DNS server provider (e.g., DNS servers provided by an anti-virus/security vendor).

The level of information provided to the consumer also varies based on the location of the resource experiencing the outage. For resources on the internet service provider's network, the internet service provider may have greater ability to control how an unavailable network resource is handled. If the resource experiencing the outage is outside of the internet service provider's network, the internet provider has no control over how an unavailable network resource is handled. Delays in propagating DNS record changes to the multitude of DNS servers make customizing DNS redirection for a specific resource unsuitable or unworkable to handle short-term outages. While standard port numbers of a resource are associated with the DNS record type (e.g., A and MX records), the DNS records do not support custom port numbers, which limits the ability to provide redirection for non-standard resources. As a result, what the user sees in response to a resource outage can vary.

Customer service related to resource outages is another concern. The current ability to determine the impact of a resource outage and mitigate the inconvenience to users is limited, at best, even when DNS redirection is available. If it becomes widely publicized compensation is being offered for a resource outage, customers that were not affected may seek to claim compensation. At the same time, customers that were actually affected may not be aware that compensation is being offered or may not want to deal with the perceived hassle of obtaining the compensation. It is with respect to these and other considerations that the present invention has been made.

BRIEF SUMMARY

Various embodiments of the system for internet protocol based outage handling collects information about the impact of selected unavailable network resources on users accessing a managed network. The outage handling system stores information identifying the unavailable network resource and monitors network traffic on the managed network for requests to access the unavailable network resource. The outage handling system intercepts requests to access the unavailable network resource and logs information associated with the request. The logged information may be used to track attempts to access the resource during the outage and analyze the actual impact of the outage. The outage handling system optionally collects additional voluntarily provided information that may be used to notify the user when the resource is available and/or to provide compensation for the access interruption caused by the outage.

The outage handling system includes a network traffic monitor, an outage content server, and an affected user database. The outage handling system is typically maintained by a managing entity (i.e., a manager) operating a managed network accessible by a user. The outage handling system may handle network resources located on the managed network (i.e., on-network) or on an external network (i.e., off-network). The off-network resources are typically operated by third parties (e.g., news providers, online retail stores, or resource hosting service companies). Available network resources are those that are functioning and accessible by a user of the managed network. Unavailable network resources are those that are not functioning and/or are not accessible by a user of the managed network.

The network traffic monitor analyzes network traffic on the managed network, intercepts a request destined for an unavailable network resource, and redirects the request to the outage content server for handling. The network traffic monitor runs a routing service configured with outage rules applied to network traffic on the managed network at the network layer. An outage response engine running on by the outage content server serves the front end for interaction with the user by sending outage-related content to the user agent. The outage content server automatically captures basic information and optionally serves content used to provide information about the outage and collect voluntarily-provided user information. The voluntarily-provided user information may be used to provide benefits to the user such as a notification when the network resource becomes available or compensation for the disruption caused by the outage. The affected user database stores the information collected by the outage content server. In various embodiments, the outage content server is in communication with one or more business support systems (e.g., a customer management or billing database).

Various embodiments of the method for internet protocol based outage handling performed by the outage handling system begin by configuring the outage handler for the unavailable resource. Once configured, the outage handler monitors the managed network for any network traffic destined for the unavailable resource. When network traffic destined for the unavailable resource is located, it is redirected to the outage content server where user information is collected, access restored notifications are handled, and access interruption compensation is handled.

The outage handler configuration operation begins by identifying unavailable network resources. The outage-related content is associated with the resource identifier of an unavailable network resource. The outage-related content includes the outage notification that is to be sent to the user agent in response a request for an unavailable network resource. An access restored notification may be enabled for an unavailable network resource. Similarly, compensation options may be selected and associated with the resource identifier of an unavailable network resource.

The network traffic monitoring operation applies the outage rules to control the flow of the network traffic. Requests sent to network resources with a resource identifier that does not satisfy the conditions of an outage rule are ignored by the outage handling system and pass on to be handled by the target network resource. If resource identifier of a request satisfies the conditions of an outage rule, the routing service redirected to the outage content server.

The outage response engine parses the resource identifier for the unavailable network resource from the redirected request and locates the outage-related content associated with the resource identifier. Next, the outage response engine sends the outage notification message to informing the user that the requested resource is unavailable to the user agent. Meanwhile, the outage response engine captures the basic information associated with the content request. The captured information allows the manager to identify the users or client devices attempting to access the resource during the outage. The basic information is associated with the resource identifier of the unavailable network resource and stored in the affected user database. Some embodiments of the outage response engine use the automatically captured basic information for customer identification by attempting to obtain information from the business system support system. If the user cannot be identified from the basic information or additional information is required, the outage response system solicits voluntarily provided user information. The voluntarily provided information is associated with the resource identifier of the unavailable network resource and stored in the affected user database.

The availability of access restored notifications for the unavailable network resource is checked. If the access restored notification is enabled for the unavailable network resource, the outage response engine solicits the user whether an access restored notification is desired and any contact information needed to provide the access restored notification. If the user opts to receive an access restored notification, the outage response engine enables the delivery of the access restored notification associated with the unavailable network resource for the user. When access is determined to have been restored, the outage response engine sends the access restored notification to the users for which access restored notification delivery has been enabled.

If compensation options are associated with the unavailable network resource, the outage response engine notifies the user that compensation may be available and solicits the user to select a compensation option and/or confirm acceptance of the compensation option. If it is determined that the affected user is a customer of the manger in operation, some embodiments of the outage response engine automatically fulfill the compensation offering. In the case of third party compensation, some embodiments of the outage response system may send the basic and/or voluntarily supplied information to the third party for processing.

BRIEF DESCRIPTION OF THE DRAWINGS

Further features, aspects, and advantages of the invention represented by the embodiments described present disclosure will become better understood by reference to the following detailed description, appended claims, and accompanying figures, wherein elements are not to scale so as to more clearly show the details, wherein like reference numbers indicate like elements throughout the several views, and wherein:

FIGS. 10A and 10B illustrate a suitable mobile computing environment with which embodiments of the system may be practiced.

DETAILED DESCRIPTION

An internet protocol (IP)-based outage handling system is described herein and illustrated in the accompanying figures. The outage handling system collects information about the impact of selected unavailable network resources on users accessing a managed network. The outage handling system stores information identifying the unavailable network resource and monitors network traffic on the managed network for requests to access the unavailable network resource. The outage handling system intercepts requests to access the unavailable network resource and logs information associated with the request. The logged information may be used to track attempts to access the resource during the outage and analyze the actual impact of the outage. The outage handling system optionally collects additional voluntarily provided information that may be used to notify the user when the resource is available and/or to provide compensation for the access interruption caused by the outage.

Figure 1:
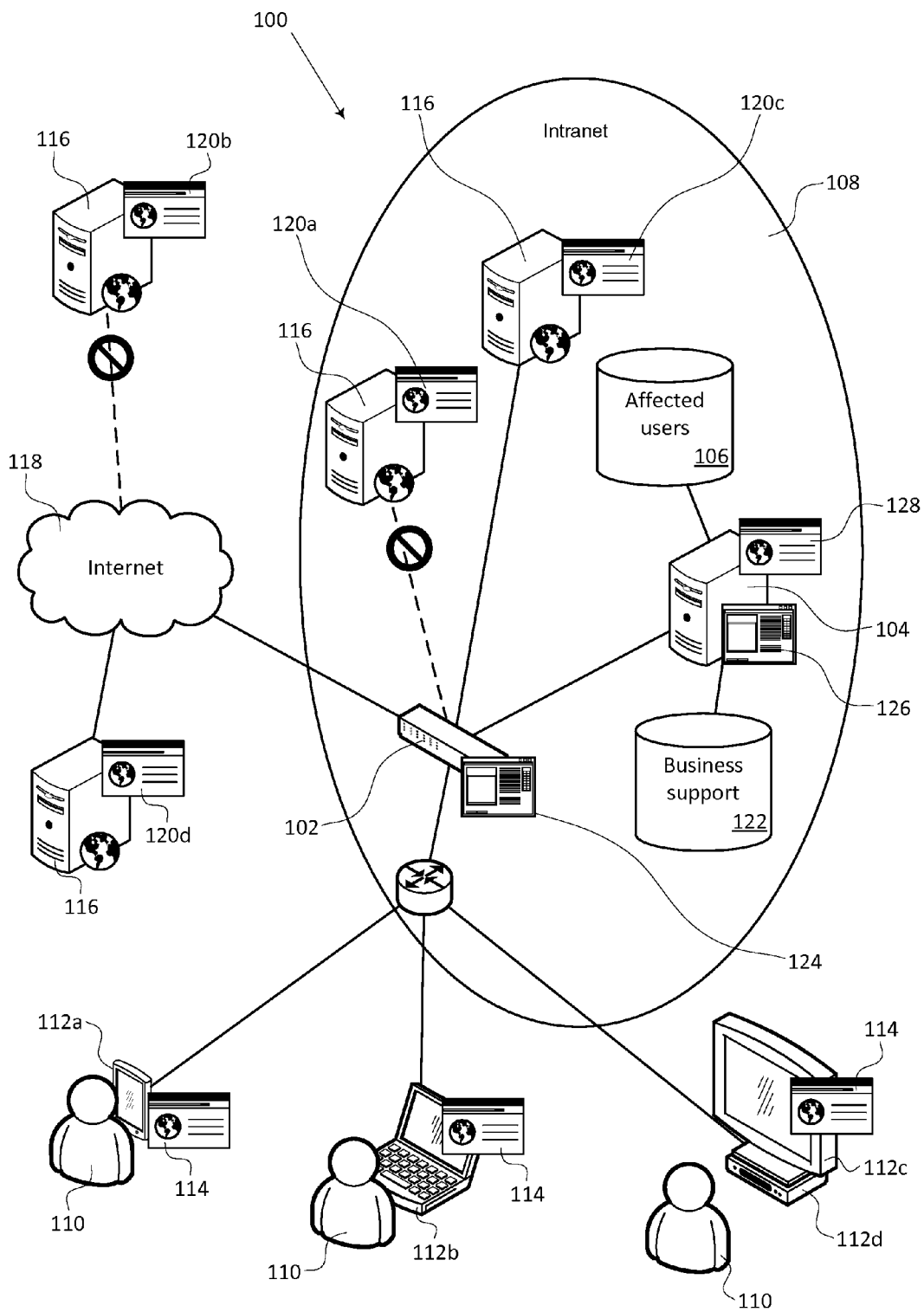
FIG. 1 illustrates one embodiment of the internet protocol-based outage handling system.

FIG. 1 illustrates one embodiment of the outage handling system. The outage handling system 100 includes a network traffic monitor 102, an outage content server 104, and an affected user database 106. The outage handling system 100 is typically maintained by a managing entity (i.e., a manager) operating a managed network 108 accessible by a user 110. For example, the manager may be an internet service provider (ISP), educational institution, business, or other entity that provides Internet access to users 110 (e.g., customers, students, or employees) and optionally provides additional network resources via the managed network 108. Examples of network resources include, but are not limited to, web portals, websites, and email services. For purposes of discussion, the outage handling system 100 is described in the context of an internet service provider (ISP), such as a cable system operator, serving as the manager.

The illustrated embodiment shows a number of users 110 accessing the managed network 108 via client devices 112a-d. Examples of suitable client devices 112a-d include, but not limited to, a mobile computing device 112a (e.g., a smart phone or tablet), a general computing device 112b (e.g., a desktop or laptop computer), and a specialized computing device such as a television 112c, a set top box 112d, or other smart appliance. The client devices 112a-d are generally capable of running a user agent 114 used to access a network resource. Examples of suitable user agents 114 include, but are not limited to, web browser and email applications. In various embodiments, the user agents 114 compatible with the outage handling system 100 are capable of rendering a hypertext markup language (HTML) document.

The illustrated embodiment also shows a number of network resources 120*a-d* running on host computing devices 116 located on the managed network 108 (i.e., on-network) or on an external network 118 (i.e., off-network), such as the Internet. The off-network resources are typically operated by third parties (e.g., news providers, online retail stores, or resource hosting service companies). More specifically, the illustrated embodiment shows an unavailable on-network resource 120*a*, an unavailable off-network resource 120*b*, an available on-network resource 120*c*, and an available off-network resource 120*d*. Available network resources are those that are functioning and accessible by a user 110 of the managed network 108. Unavailable network resources are those that are not functioning and/or are not accessible by a user 110 of the managed network 108. Exemplary reasons that a network resource may be unavailable include, but are not limited to, hardware or software failures/crashes, hardware or software upgrades, system maintenance, network failures, and domain name system entry misconfiguration.

The network traffic monitor 102 analyzes network traffic on the managed network 108, intercepts a request destined for an unavailable network resource 120*a-b*, and redirects the request to the outage content server 104 for handling. The terms "request" and "response" are used to describe network traffic with directionality and should not be construed as requiring any specific communication protocol. In various embodiments, the requests and responses handled by the outage handling system 100 are hypertext transfer protocol (HTTP) requests and HTTP responses. In some embodiments, the response to a request for resource in the outage list is a HTTP 302 redirect. The outage content server 104 automatically captures basic information and optionally serves content used to provide information about the outage and collect voluntarily-provided user information. The voluntarily-provided user information may be used to provide benefits to the user 110 such as a notification when the network resource becomes available or compensation for the disruption caused by the outage. The affected user database 106 stores the information collected by the outage content server 104. The affected user database 106 may be an independent database maintained by the outage handling system 100. In various embodiments, the outage content server 104 is in communication with one or more business support systems 122 (e.g., a customer management or billing database).

In one embodiment, the network traffic monitor 102 is a network device running a routing service 124 configured with outage rules applied to network traffic on the managed network 108 at the network layer. In an alternate embodiment, the network traffic monitor 102 is a network device in communication with a computing device running the routing service 124. The outage rules applied by the routing service 124 are resource identifier-based. Examples of suitable resource identifiers include, but are not limited to, one or more of the domain name, the uniform resource locator (URL), the IP address, and the port number of the target resource specified by the request. If a request destined for an unavailable network resource 120*a-b* is received, the routing service 124 redirects the request to the outage content server 104 for handling. Because the request is handled before reaching the unavailable web site, no special handling is required by the unavailable web site. In other words, the outage handling system 100 preempts handling of the request by the unavailable network resource 120*a-b*. Examples of suitable network devices include, but are not limited to, network switches, network routers, network port analyzers, network appliances, and other network hardware having port mirroring/replication and/or programmable routing functionality.

An outage response engine 126 running on the outage content server 104 serves the front end for interaction with the user 110 by sending outage-related content 128 to the user agent 114. Examples of suitable outage-related content 128 served by the outage content server 104 include, but are not limited to, web portals, web pages, and HTML forms, in-application messages, and email messages. In-application messages (e.g., in-browser messages) are messages that may be displayed to the user 110 via the user agent 114, for example, as a pop-up message from a remote source. At a minimum, the outage-related content 128 notifies the user 110 that the requested resource is unavailable and captures basic information that may be automatically obtained or derived from the request or a client device 112*a-d*. Examples of the basic information that may be captured by the outage response engine 126 include, but are not limited to, the media access control (MAC) address of the client gateway (i.e., the client modem) from where the request originated, the MAC address or telephone number of the client device 112*a-d* making the request, the IP address assigned to the client device 112*a-d* making the request, the IP address and/or URL of the requested unavailable network resource 120*a-b*, and the date/time of the request.

In some embodiments, the outage-related content 128 includes a form that may be voluntarily filled out by the user 110 to receive compensation for the outage. In various embodiments, the user 110 has the opportunity to select from one or more compensation options. As with the basic information, the voluntarily provided information is stored in the affected user database 106 for subsequent use. Some embodiments of the outage content server 104 also use the voluntarily provided information to notify to the user 110 when the network resource becomes available again.

Figure 2:
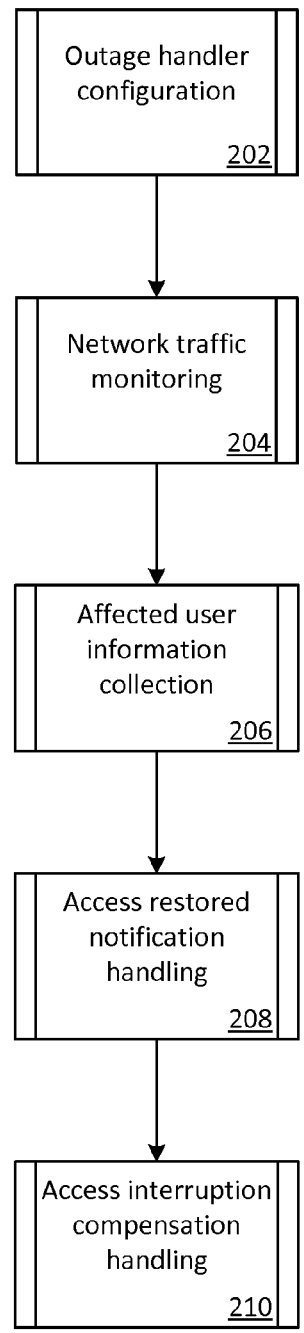
FIG. 2 is a flowchart of one embodiment of the method for internet protocol-based outage handling.

FIG. 2 is a flowchart showing one embodiment of the method for IP-based outage handling. The outage handling method 200 begins by configuring the outage handler for the unavailable resource in operation 202. Once configured, the outage handler monitors the managed network 108 for any network traffic destined for the unavailable resource 204. When network traffic destined for the unavailable resource is located, it is redirected to the outage content server 104 where user information is collected in operation 206, access restored notifications are handled in operation 208, and access interruption compensation is handled in operation 210.

Figure 3:
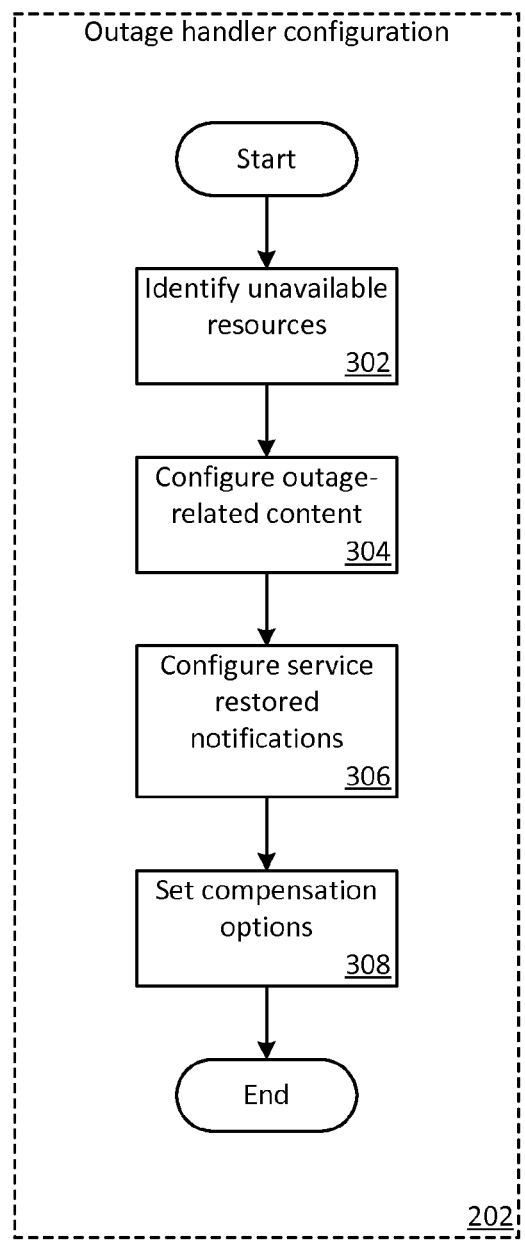
FIG. 3 illustrates one embodiment of the outage handler configuration operation.

FIG. 3 illustrates one embodiment of the outage handler configuration operation. The outage handler configuration operation 202 begins by identifying unavailable network resources in operation 302. In various embodiments, the manager creates outage rules in the routing service 124 for the resource identifiers associated with unavailable network resources. Outage rules may be created for individual resource identifiers (e.g., a specific IP address or URL) or groups of resource identifiers (e.g., a range of IP addresses or a wildcard domain name). In some embodiments, the manager manually creates outage rules for handling unavailable network resources. In other embodiments, the manager adds entries to an outage list. The outage list may be stored and maintained by the routing service 124 or by the outage response engine 126. The outage list is a collection of resource identifiers associated with unavailable network resources. The outage list may be used to supply arguments for a master outage handling outage rule applied by the routing service 124. Alternatively, the outage list may be used by the routing service 124 to automatically create outage rules for handling unavailable network resources.

The outage-related content 128 is associated with the resource identifier of an unavailable network resource 120a-b in operation 304. The outage-related content 128 includes the outage notification that is to be sent to the user agent 114 in response a request for an unavailable network resource 120a-b. A stock outage notification may be used for all unavailable network resources or the outage notification may be customized for an unavailable network resource 120a-b. An access restored notification may be enabled for an unavailable network resource 120a-b in operation 306. Similarly, compensation options may be selected and associated with the resource identifier of an unavailable network resource 120a-b in operation 308.

Figure 4:
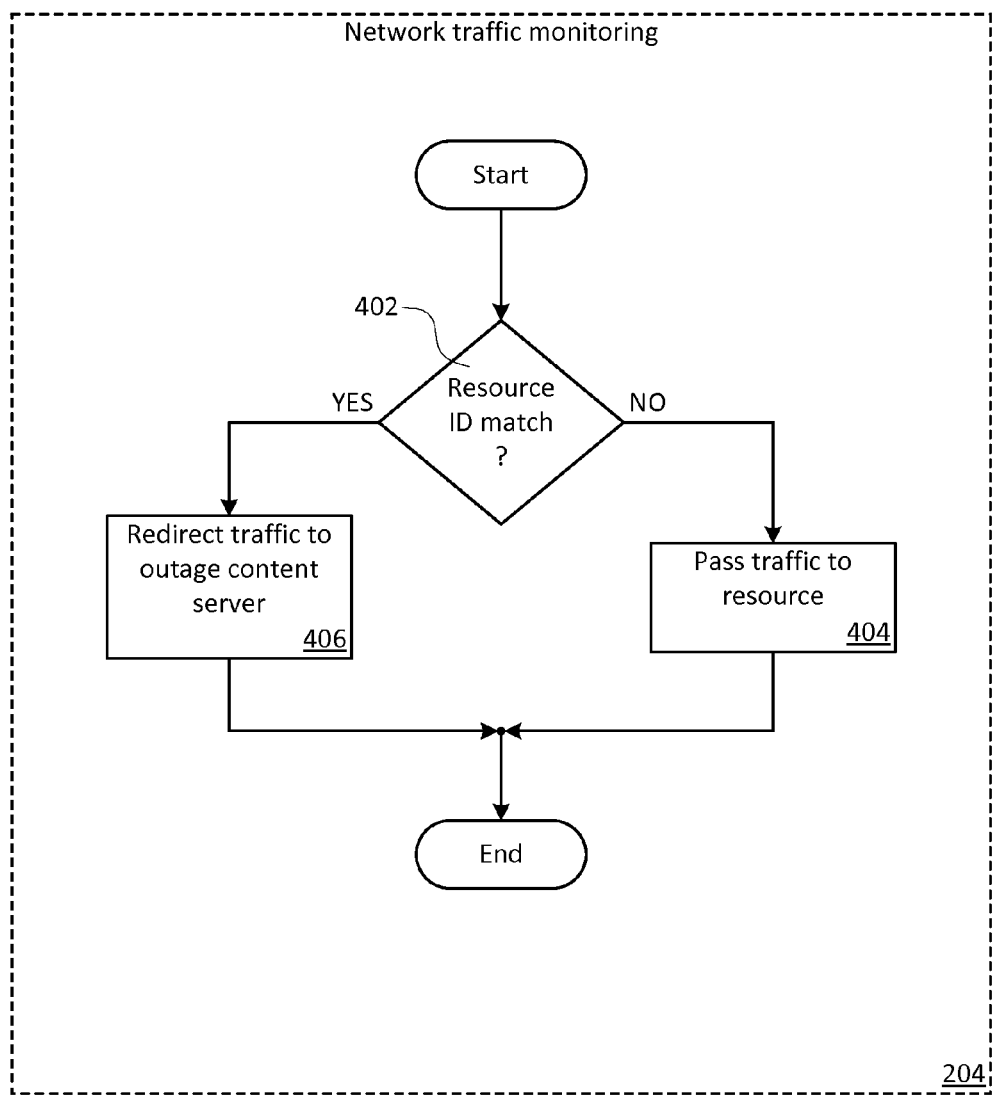
FIG. 4 illustrates one embodiment of the network traffic monitoring operation.

FIG. 4 illustrates one embodiment of the network traffic monitoring operation. The network traffic monitoring operation 204 applies the outage rules to control the flow of the network traffic in operation 402. For example, the routing service 124 compares the target IP address from the request to the IP addresses (or IP address ranges) of the unavailable network resources. Requests sent to network resources with a resource identifier that does not satisfy the conditions of an outage rule are ignored by the outage handling system 100 and pass on to be handled by the target network resource in operation 404. If resource identifier of a request satisfies the conditions of an outage rule, the routing service 124 redirected to the outage content server 104 in operation 406.

Figure 5:
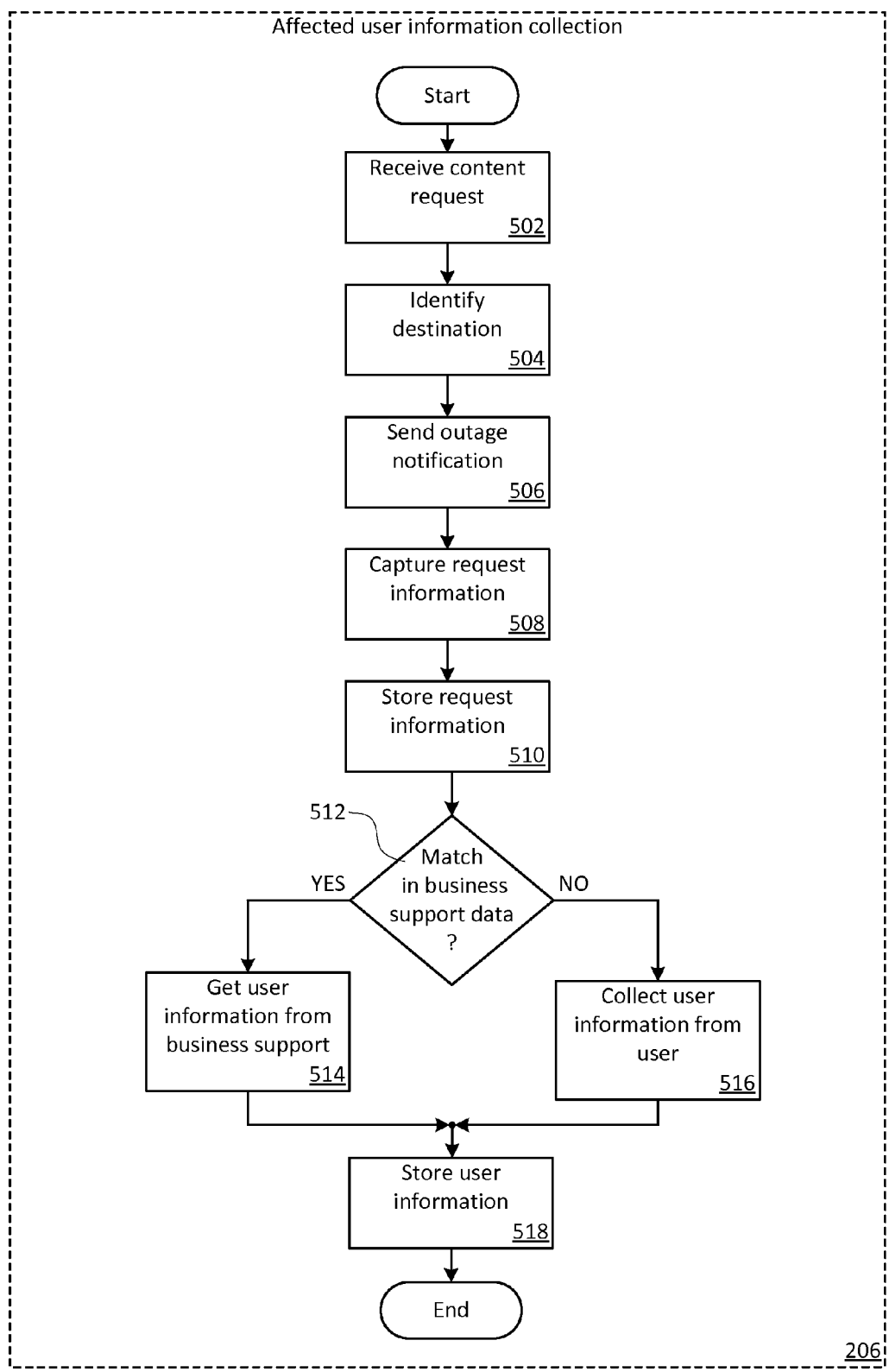
FIG. 5 illustrates one embodiment of the affected user information collection operation.

FIG. 5 illustrates one embodiment of the affected user information collection operation. The redirected request is received at the outage content server 104 in operation 502. The outage response engine 126 parses the resource identifier for the unavailable network resource 120a-b from the request and locates the outage-related content 128 associated with the resource identifier in operation 504. Next, the outage response engine 126 sends the outage notification message to informing the user 110 that the requested resource is unavailable to the user agent 114 in operation 506. For example, the outage notification message may be a HTTP response containing a HTML document (e.g., a web page) displayable by a web browser application running on the client device 112a-d and viewable by the user 110 of the client device 112a-d and may optionally include an in-browser notification.

Meanwhile, the outage response engine 126 captures the basic information associated with the content request in operation 508. The captured information allows the manager to identify the users 110 or client devices 112a-d attempting to access the resource during the outage. In various embodiments, the information is captured automatically. In some embodiments, some or all of the basic information is obtained from the headers and/or body of the request. In some embodiments, the outage notification message contains scripts or other code used to collect the identifying information from the client device 112a-d and/or the gateway device associated with the client device 112a-d. In other embodiments, the outage response engine 126 queries the client device 112a-d and/or the gateway device directly to obtain the basic information. The basic information is associated with the resource identifier of the unavailable network resource 120a-b and stored in the affected user database 106 in operation 510.

In addition to the basic information, the outage response engine 126 may obtain additional information about the user 110 to provide benefits such as access interruption compensation and/or an access restored notification. Some embodiments of the outage response engine 126 use the automatically captured basic information for customer identification by attempting to obtain information from the business system support system in operation 512. The outage response engine 126 compares some or all of the basic information against the information maintained by the business support system 122. The comparison may use automatically collected information (e.g., the MAC address or telephone number of the client or gateway device) or voluntarily provided information (e.g., username or account number). If the basic information is associated with a customer, the outage response engine 126 retrieves information about the customer from the business support system 122 in operation 514. In some cases, the outage response engine 126 presents the information retrieved from the business support system 122 and solicits confirmation of the user's identity.

If the user 110 cannot be identified from the basic information or additional information is required, the outage response system solicits voluntarily provided user information 516. The information typically requested for benefit processing includes, but is not limited to, information identifying the user 110 of the client as a customer of the manager or the provider of the affected resource and contact information for the user 110 of the client. Examples of the user identity information requested include, but are not limited to, the user's name, the user's email address, and the user's account number and/or username with the manager and/or the provider of the unavailable network resource 120a-b. The voluntarily provided information is associated with the resource identifier of the unavailable network resource 120a-b and stored in the affected user database 106 in operation 518.

Figure 6:
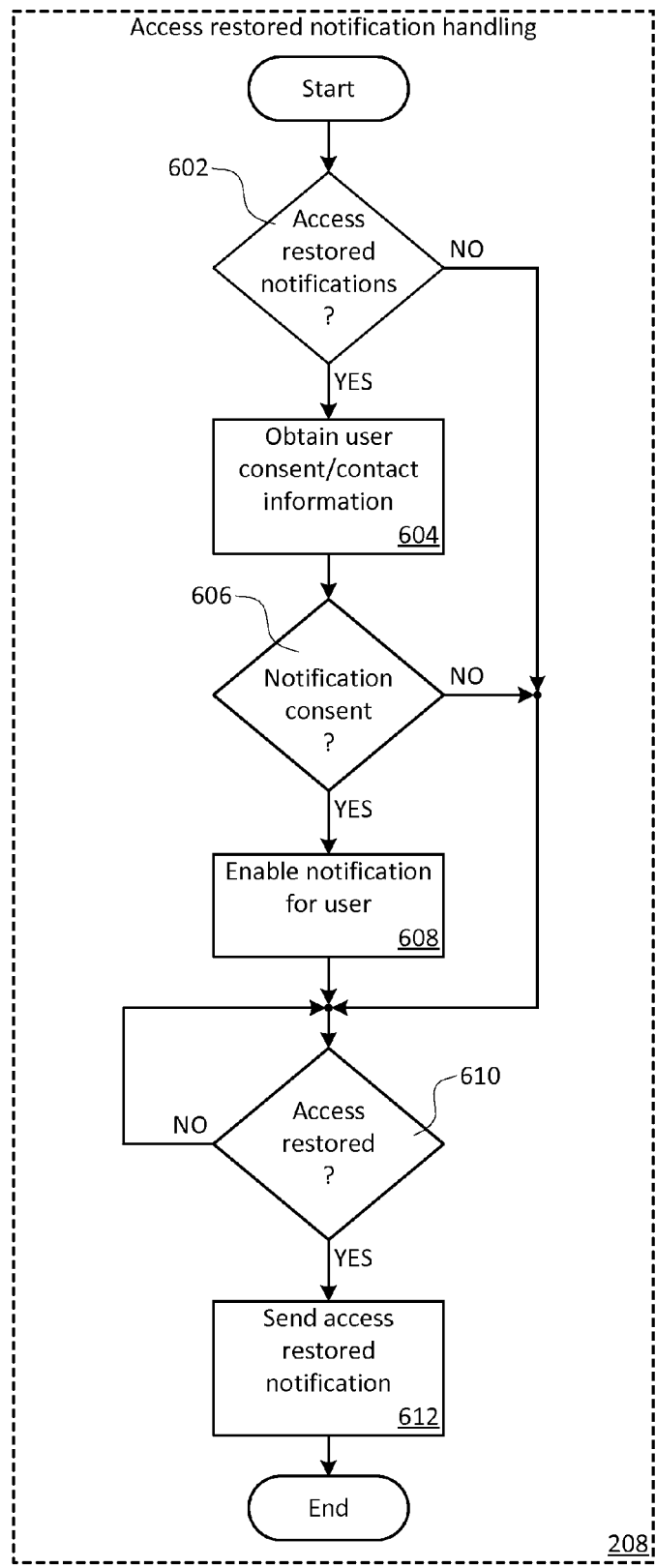
FIG. 6 illustrates one embodiment of the access restored notification handling operation.

FIG. 6 illustrates one embodiment of the access restored notification handling operation. The availability of access restored notifications for the unavailable network resource 120a-b is checked in operation 602. If the access restored notification is enabled for the unavailable network resource 120a-b, the outage response engine 126 solicits from the user 110 whether an access restored notification is desired and any information (e.g., an email address and/or a mobile phone number) needed to provide the access restored notification in operation 604. If the user 110 opts to receive an access restored notification in operation 606, the outage response engine 126 enables the delivery of the access restored notification associated with the unavailable network resource 120a-b for the user 110 in operation 608. In some embodiments, enabling the delivery of the access restored notification includes adding the user's contact information to a contact list associated with the unavailable network resource 120a-b. In other embodiments, enabling the delivery of the access restored notification includes flagging the user information associated with the unavailable network resource 120a-b for later retrieval.

When access is determined to have been restored in operation 610, the outage response engine 126 sends the access restored notification to the users 110 for which access restored notification delivery has been enabled in operation 612. In various embodiments, the outage response engine 126 monitors the outage rules or the outage list for changes. In some embodiments, the routing service 124 notifies the outage response server when the outage rules or the outage list changes. When the outage rule for a network resource is removed or a resource identifier is removed from the outage list, the outage response engine 126 automatically generates and sends access restored notifications. In other embodiments, the generation and sending of access restored notifications by outage response engine 126 is initiated by the manager.

Figure 7:
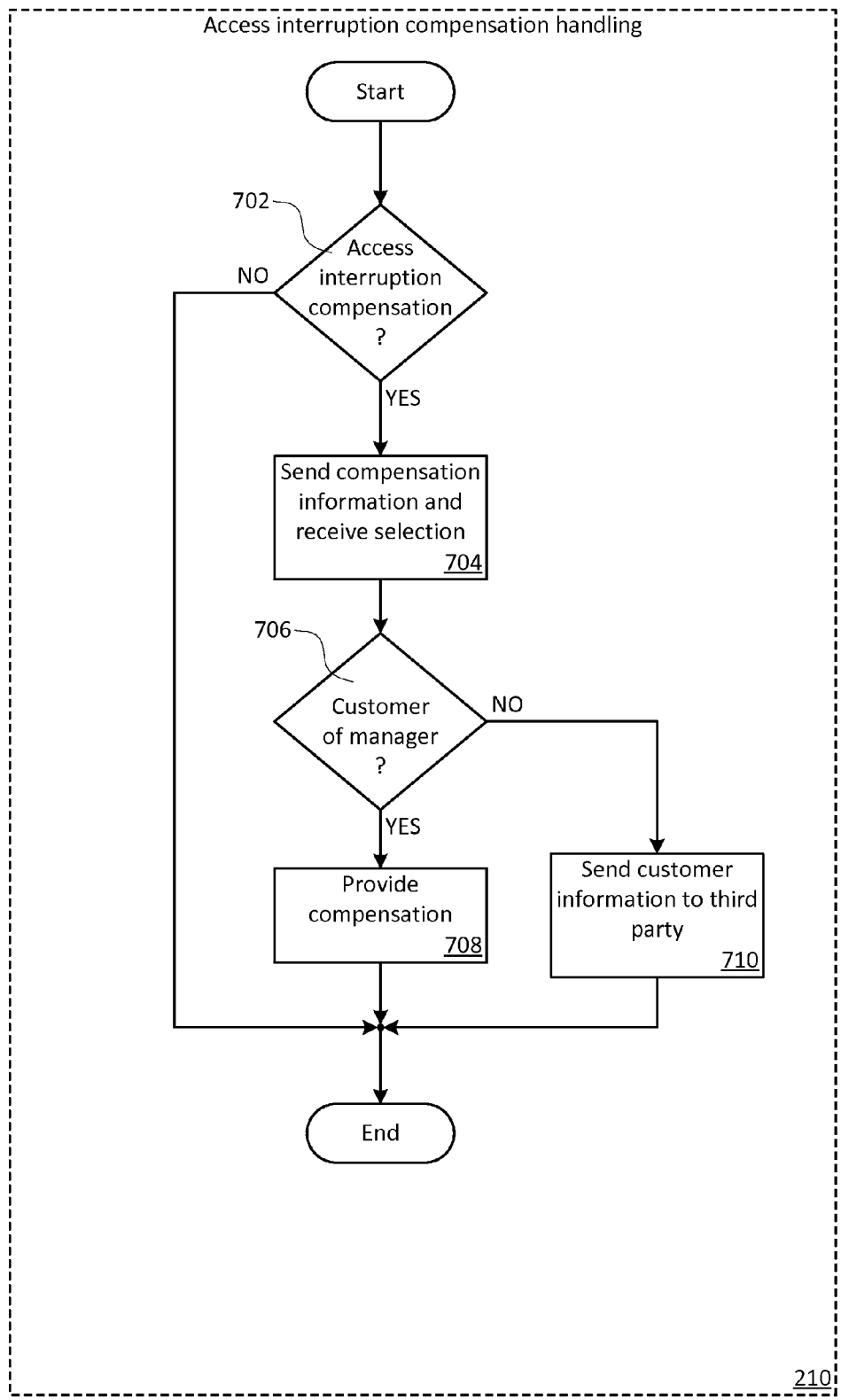
FIG. 7 illustrates one embodiment of the access interruption compensation handling operation.

FIG. 7 illustrates one embodiment of the access interruption compensation handling operation. The availability of compensation options associated with the unavailable network resource 120a-b is checked in operation 702, the outage response engine 126 notifies the user 110 that compensation may be available and solicits the user 110 to select a compensation option and/or confirm acceptance of the compensation option in operation 704. Some embodiments do not require acceptance confirmation when only a single compensation option is available. Examples of compensation options include, but are not limited to, a credit applied to the account of the affected user 110, access to additional or premium services for a limited time or number of uses at no cost or a discounted cost, a discount or credit towards a future purchase, and promotional merchandise. As an example, a cable operator might offer its customer impacted by an on-network resource outage the choice of a monetary credit on the customer's monthly bill or a free pay-per-view movie.

In various embodiments, third parties may enjoy the benefits of the outage handling system 100 through an arrangement with the manager. For example, an internet retailer responsible for an off-network resource outage might choose to offer affected users 110 a discount (e.g., a percentage or dollar amount) on a future purchase. In another example, a sports network responsible for an off-network resource outage may agree to reimburse the cable operator for providing a premium service (e.g., a free month of a premium sports channel) to the affected user 110.

Not all users 110 may be eligible for available compensation. Some embodiments of the outage response engine 126 may attempt to verify eligibility prior to offering compensation. Eligibility may be automatically verified by the same or similar techniques used to identify customers. Where eligibility cannot be automatically verified, the outage handling system 100 may accept the voluntarily supplied compensation request but provide notice that fulfillment compensation request is contingent upon eligibility verification. In the case of third party compensation, some embodiments may send the basic and/or voluntarily supplied information to the third party for eligibility verification before offering compensation options.

If it is determined that the affected user 110 is a customer of the manger in operation 706, some embodiments of the outage response engine 126 automatically fulfill the compensation offering in operation 708. Example of automatic compensation fulfillment include, but are not limited to, updating the customer's account (e.g., entering a billing credit or adding complimentary service), providing the customer with a redeemable code (e.g., a discount code), or generating and submitting an order via one or more of the business services systems linked to the outage handling system 100. In the case of third party compensation, some embodiments of the outage response system may send the basic and/or voluntarily supplied information to the third party either as it is received or when access is restored in operation 710.

The information collected by outage handling system 100 may be used by the manager to analyze the impact of the outage. The level of analysis available to the manager varies with the type and amount of information collected by the outage content server 104. In various embodiments, the information collected by the outage content server 104 may be analyzed in the aggregate to determine the number of users 110 actually impacted by the resource outage without personally identifying affected users 110. When available, the voluntarily provided information may be used by the manager for enhanced analysis of the impact of the outage.

The captured information may also be used where contemporaneous compensation is not offered. For example, when a customer calls in to complain about the resource outage, the captured information would provide a record that the customer attempted to access the resource during the outage. This knowledge allows customer service to take appropriate measures to address the customer's complaint (e.g., offering compensation) with assurance that the customer was actually impacted by the outage rather than attempting to "cash in" on a publicly or privately reported outage.

Figure 8:
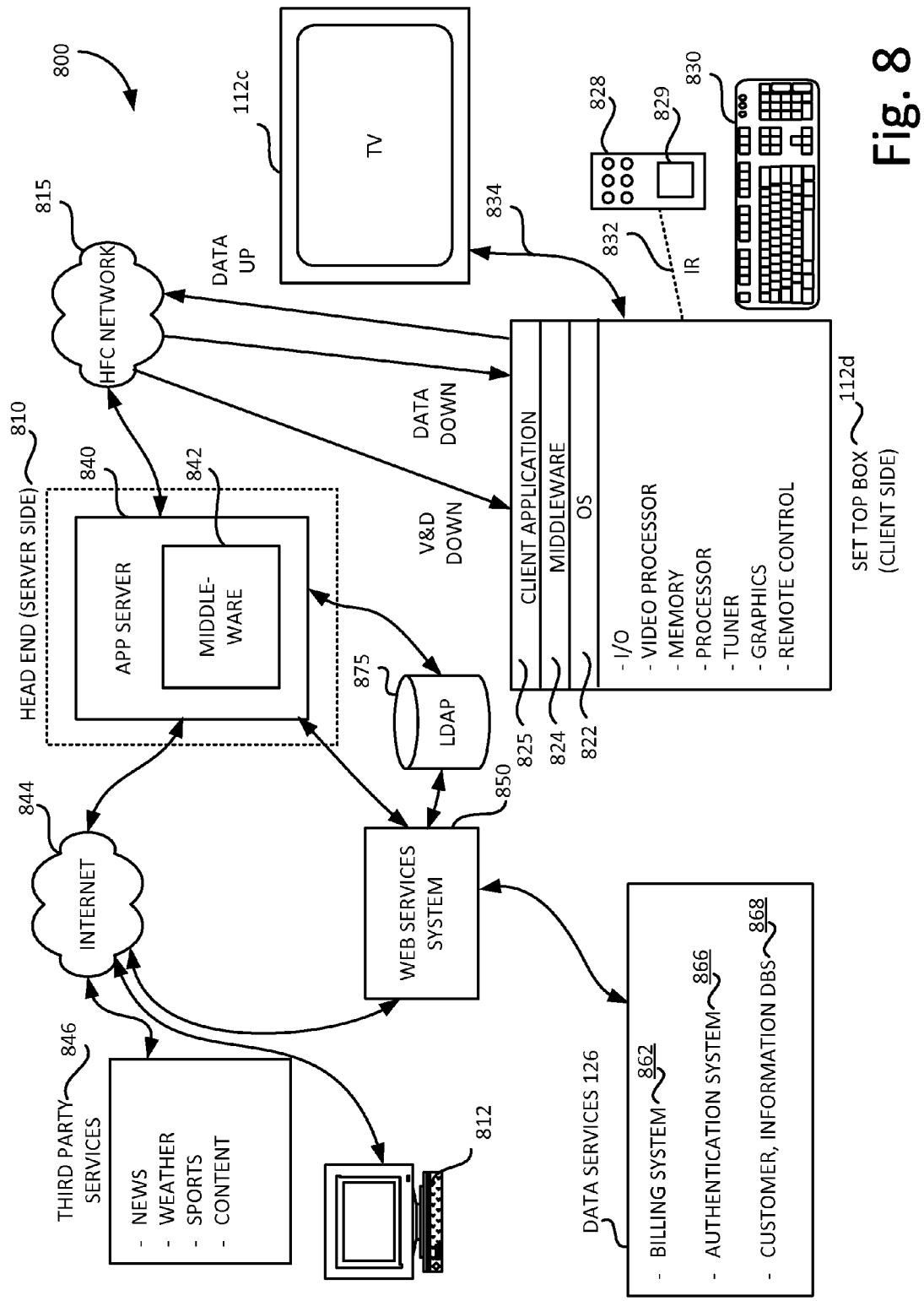
FIG. 8 is a simplified block diagram illustrating a cable television services system.

FIG. 8 is a simplified block diagram illustrating a cable television services system 800 (hereafter referred to as "CATV") architecture providing an operating environment according to an embodiment. As should be appreciated, a CATV services system 800 is but one of various types of systems that may be utilized for providing an operating environment for providing IP-based outage handling. Digital and analog video programming, information content, and interactive television services are provided via a hybrid fiber coax (HFC) network 815 to a television set 112c for consumption by a cable television/services system customer. As is known to those skilled in the art, HFC networks 815 combine both optical fiber and coaxial cable lines. Typically, optical fiber runs from the cable head end 810 to neighborhoods of subscribers. Coaxial cable runs from the optical fiber feeders to each customer or subscriber. The functionality of the HFC network 815 allows for efficient bidirectional data flow between the client-side set-top box 112d and the server-side application server 840 of the embodiment.

The CATV system 800 is in the form of a distributed client-server computing system for providing video and data flow across the HFC network 815 between server-side services providers (e.g., cable television/services providers) via a server-side head end 810 and a client-side customer via a client-side set-top box 112d functionally connected to a customer receiving device, such as the television set 112c. As is understood by those skilled in the art, modern CATV systems 800 may provide a variety of services across the HFC network 815 including traditional digital and analog video programming, telephone services, high speed Internet access, video-on-demand, and information services.

On the client side of the CATV system 800, digital and analog video programming and digital and analog data are provided to the customer television set 112c via the set-top box 112d. Interactive television services that allow a customer to input data to the CATV system 800 likewise are provided by the set-top box 112d. In the illustrated embodiment, the set-top box 112d is a multipurpose computing device having a computer processor, memory, and an input/output mechanism. The input/output mechanism receives input from server-side processes via the HFC network 815 and from customers via input devices such as the remote control device 828, keyboard 830, or other computing device 812, such as a smart phone 112a, a personal computer (e.g., a laptop or desktop) 112b, a smart television 112c, a set-top box 112d, a tablet/slate computer, etc. The remote control device 828 and the keyboard 830 may communicate with the television 112c or the set-top box 112d via a suitable communication transport such as the infrared connection 832. The remote control device 828 may include a biometric input module 829. The set-top box 112d also includes a video processor for processing and providing digital and analog video signaling to the television set 112c via a cable communication transport 834. A multi-channel tuner is provided for processing video and data to and from the set-top box 112d and the server-side head end system 810, described below.

The set-top box 112d also includes an operating system 822 for directing the functions of the set-top box 112d in conjunction with a variety of client applications 825. For example, if a client application 825 requires a news flash from a third-party news source to be displayed on the television set 112c, the operating system 822 may cause the graphics functionality and video processor of the set-top box 112d, for example, to output the news flash to the television set 112c at the direction of the client application 825 responsible for displaying news items.

Because a variety of different operating systems 822 may be utilized by a variety of different brands and types of set-top boxes, a middleware layer 824 may be provided to allow a given software application to be executed by a variety of different operating systems. According to an embodiment, the middleware layer 824 may include a set of application programming interfaces (APIs) that are exposed to client applications 825 and operating systems 822 that allow the client applications to communicate with the operating systems through common data calls understood via the API set. As described below, a corresponding middleware layer is included on the server side of the CATV system 800 for facilitating communication between the server-side application server and the client-side set-top box 112d. The middleware layer 842 of the server-side application server and the middleware layer 824 of the client-side set-top box 112d may format data passed between the client side and server side according to the Extensible Markup Language (XML).

According to one embodiment, the set-top box 112d passes digital and analog video and data signaling to the television set 112c via a one-way communication transport 834. According to other embodiments, two-way communication transports may be utilized, for example, via high definition multimedia (HDMI) ports. The set-top box 112d may receive video and data from the server side of the CATV system 800 via the HFC network 815 through a video/data downlink and data via a data downlink. The set-top box 112d may transmit data from the client side of the CATV system 800 to the server side of the CATV system 800 via the HFC network 815 via one data uplink. The video/data downlink is an "in band" downlink that allows for digital and analog video and data signaling from the server side of the CATV system 800 through the HFC network 815 to the set-top box 112d for use by the set-top box 112d and for distribution to the television set 112c. As is understood by those skilled in the art, the "in band" signaling space operates at a relative high frequency, e.g., between 54 MHz and 1000 MHz. The signaling space is generally divided into channels which may be transmitted as a single analog signal or a greater number (e.g., ten) of digital signals.

The data downlink and the data uplink between the HFC network 815 and the set-top box 112d comprise "out of band" data links. As is understand by those skilled in the art, the "out of band" frequency range is generally at a lower frequency than "in band" signaling. For example, the "out of band" frequency range may be between 0 MHz and 54 MHz. Data flow between the client-side set-top box 112d and the server-side application server 840 is typically passed through the "out of band" data links. Alternatively, an "in band" data carousel may be positioned in an "in band" channel into which a data feed may be processed from the server-side application server 840 through the HFC network 815 to the client-side set-top box 112d. Operation of data transport between components of the CATV system 800 is well known to those skilled in the art.

The head end 810 of the CATV system 800 is positioned on the server side of the CATV system and includes hardware and software systems responsible for originating and managing content for distributing through the HFC network 815 to client-side set-top boxes 112d for presentation to customers via television set 112c. As described above, a number of services may be provided by the CATV system 800, including digital and analog video programming, interactive television services, telephone services, video-on-demand services, targeted advertising, and provision of information content.

The application server 840 is a general-purpose computing system operative to assemble and manage data sent to and received from the client-side set-top box 112d via the HFC network 815. As described above with reference to the set-top box 112d, the application server 840 includes a middleware layer 842 for processing and preparing data from the head end of the CATV system 800 for receipt and use by the client-side set-top box 112d. For example, the application server 840 via the middleware layer 842 may obtain data from third-party services 846 via the Internet 844 for transmitting to a customer through the HFC network 815 and the set-top box 112d. For example, content metadata a third-party content provider service may be downloaded by the application server via the Internet 844. When the application server 840 receives the downloaded content metadata, the middleware layer 842 may be utilized to format the content metadata for receipt and use by the set-top box 112d. Therefore, content metadata may be sent and categorized based on the availability to the customer's program guide data.

According to one embodiment, data obtained and managed by the middleware layer 842 of the application server 840 is formatted according to the Extensible Markup Language and is passed to the set-top box 112d through the HFC network 815 where the XML-formatted data may be utilized by a client application 825 in concert with the middleware layer 824, as described above. As should be appreciated by those skilled in the art, a variety of third-party services data, including news data, weather data, sports data and other information content may be obtained by the application server 840 via distributed computing environments such as the Internet 844 for provision to customers via the HFC network 815 and the set-top box 112d. According to embodiments, client application 825 may include the user agent 114 described herein.

According to embodiments, the application server 840 obtains customer support services data, including billing data, information on customer work order status, answers to frequently asked questions, services provider contact information, and the like from data services for provision to the customer via an interactive television session. In the illustrated embodiment, the services provider data services include a number of services operated by the services provider of the CATV system 800 which may include data on a given customer.

A billing system 862 may include information such as a customer's name, street address, business identification number, Social Security number, credit history, and information regarding services and products subscribed to by the customer. According to embodiments, the billing system 862 may also include billing data for services and products subscribed to by the customer for bill processing, billing presentment, and payment receipt.

A customer information database 868 may include general information about customers such as place of employment, business address, business telephone number, and demographic information such as age, gender, educational level, and the like. The customer information database 868 may also include information on pending work orders for services or products ordered by the customer. The customer information database 868 may also include general customer information such as answers to frequently asked customer questions and contact information for various service provider offices/departments. As should be understood, this information may be stored in a variety of disparate databases operated by the cable services provider.

The web services system 850 is illustrated between the application server 840 and the data services. According to embodiments, web services system 850 serves as a collection point for data requested from each of the disparate data services systems comprising the data services. According to embodiments, when the application server 840 requires customer services data from one or more of the data services, the application server 840 passes a data query to the web services system 850. The web services system formulates a data query to each of the available data services systems for obtaining any required data for a requesting customer as identified by a set-top box identification associated with the customer. The web services system 850 serves as an abstraction layer between the various data services systems and the application server 840. That is, the application server 840 is not required to communicate with the disparate data services systems, nor is the application server 840 required to understand the data structures or data types utilized by the disparate data services systems. The web services system 850 is operative to communicate with each of the disparate data services systems for obtaining necessary customer data. The customer data obtained by the web services system is assembled and is returned to the application server 840 for ultimate processing via the middleware layer 842, as described above.

An authentication system 866 may include information such as secure user names, subscriber profiles, subscriber IDs, and passwords utilized by customers for access to network services. As should be understood by those skilled in the art, the disparate systems 850, 862, 866, 868 may be integrated or provided in any combination of separate systems, of which the illustrated embodiment is only one example.

Figure 9:
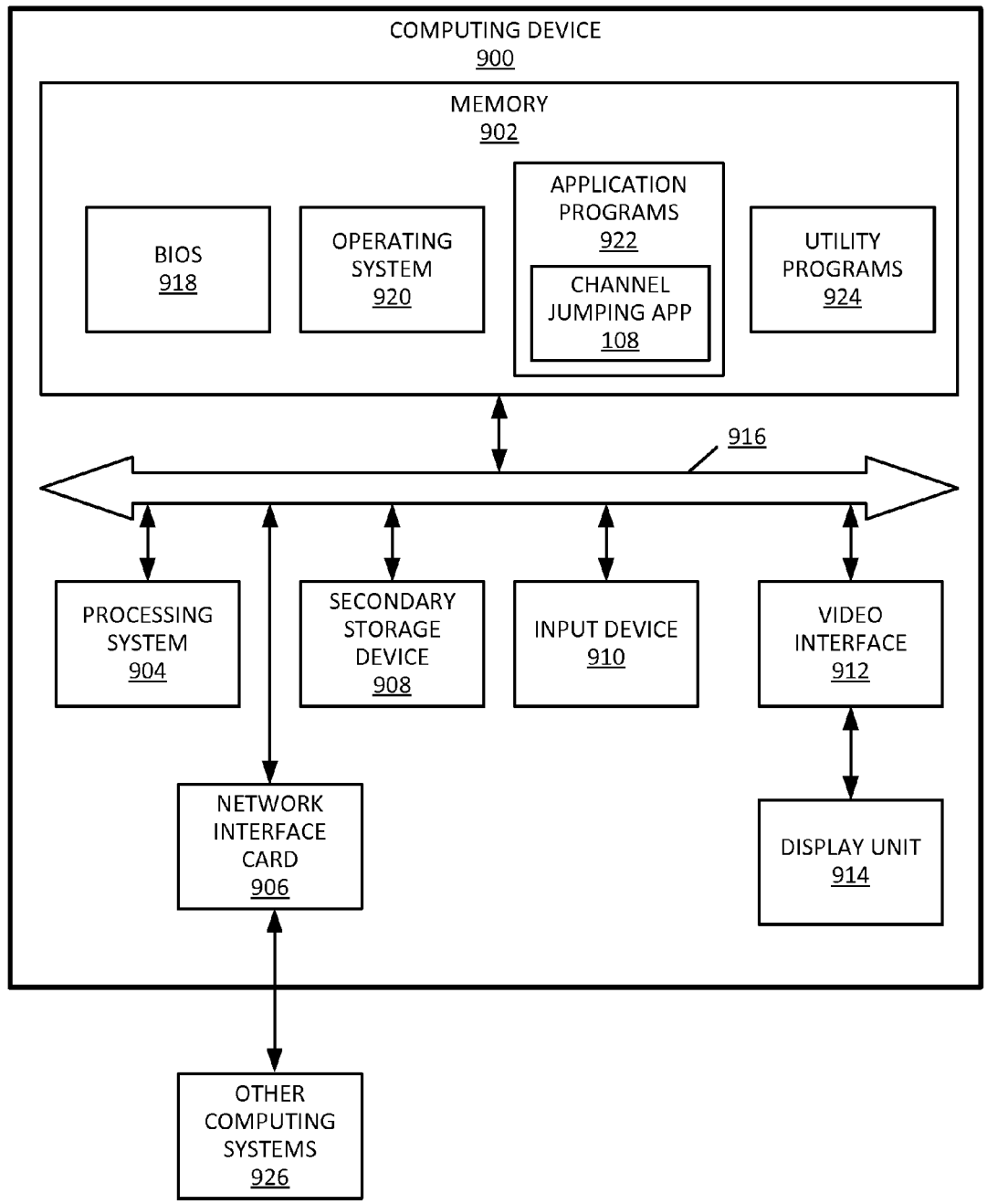
FIG. 9 is a simplified block diagram illustrating example physical components of a computing device with which embodiments of the system may be practiced.

FIG. 9 is a simplified block diagram illustrating example physical components of a computing device 900 with which embodiments of the system 100 may be practiced. In some embodiments, one or more of the components of system 100 may be implemented using one or more computing devices like the computing device 900. It should be appreciated that in other embodiments, components of system 100 may be implemented using computing devices having hardware components other than those illustrated in the illustrated embodiment.

Computing devices may be implemented in different ways in different embodiments. For instance, in the illustrated embodiment, the computing device 900 includes a processing system 904, memory 902, a network interface 906, a secondary storage device 908, an input device 910, a video interface 912, a display unit 914, and a communication medium 916. In other embodiments, the computing device 900 may be implemented using more or fewer hardware components (e.g., a video interface, a display unit, or an input device) or in combination with other types of computer systems and program modules 926.

The memory 902 includes one or more computer-readable storage media capable of storing data and/or computer-executable instructions. According to one embodiment, the user agent 114, the routing engine 124, and the outage response engine 126 may be stored locally on computing device 900. Memory 902 thus may store the computer-executable instructions that, when executed by processor 904, cause the routing engine 124 and the outage response engine 126 to provide IP-based outage handling as described above.

In various embodiments, the memory 902 is implemented in various ways. For example, the memory 902 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage media refers to devices and other articles of manufacture that store data and/or computer-executable instructions readable by a computing device and specifically excludes communications media. The term computer-readable storage media encompasses volatile or nonvolatile and removable or non-removable media implemented in various methods or technologies for storage and retrieval of information. Such information can include data structures, program modules, computer-executable instructions, or other data.

The processing system 904 includes one or more processing units, which may include tangible integrated circuits that selectively execute computer-executable instructions. In various embodiments, the processing units in the processing system 904 are implemented in various ways. For example, the processing units in the processing system 904 can be implemented as one or more processing cores. In this example, the processing system 904 can comprise one or more Intel Core microprocessors. In another example, the processing system 904 can comprise one or more separate microprocessors. In yet another example embodiment, the processing system 904 can comprise Application-Specific Integrated Circuits (ASICs) that provide specific functionality. In yet another example, the processing system 904 provides specific functionality by using an ASIC and by executing computer-executable instructions.

The computing device 900 may be enabled to send data to and receive data from a communication network via a network interface card 906. In different embodiments, the network interface card 906 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 908 includes one or more computer-readable storage media, and may store data and computer-executable instructions not directly accessible by the processing system 904. That is, the processing system 904 performs an I/O operation to retrieve data and/or computer-executable instructions from the secondary storage device 908. In various embodiments, the secondary storage device 908 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 910 enables the computing device 900 to receive input from a user 110. Example types of input devices include, but are not limited to, keyboards, mice, trackballs, stylus input devices, key pads, microphones, joysticks, touch-sensitive display screens, and other types of devices that provide user input to the computing device 900.

The video interface 912 outputs video information to the display unit 914. In different embodiments, the video interface 912 is implemented in different ways. For example, the video interface 912 is a video expansion card. In another example, the video interface 912 is integrated into a motherboard of the computing device 900. In various embodiments, the display unit 914 can be a an LCD display panel, a touch-sensitive display panel, an LED screen, a projector, a cathode-ray tube display, or another type of display unit. In various embodiments, the video interface 912 communicates with the display unit 914 in various ways. For example, the video interface 912 can communicate with the display unit 914 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 916 facilitates communication among the hardware components of the computing device 900. In different embodiments, the communications medium 916 facilitates communication among different components of the computing device 900. For instance, in the illustrated embodiment, the communications medium 916 facilitates communication among the memory 902, the processing system 904, the network interface card 906, the secondary storage device 908, the input device 910, and the video interface 912. In different embodiments, the communications medium 916 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 902 stores various types of data and/or software instructions. For instance, in the illustrated embodiment, the memory 902 stores a Basic Input/Output System (BIOS) 918, and an operating system 920. The BIOS 918 includes a set of software instructions that, when executed by the processing system 904, cause the computing device 900 to boot up. The operating system 920 includes a set of software instructions that, when executed by the processing system 904, cause the computing device 900 to provide an operating system that coordinates the activities and sharing of resources of the computing device 900. The memory 902 also stores one or more application programs 922 that, when executed by the processing system 904, cause the computing device 900 to provide applications to users, for example, the user agent 114, the routing engine 124, and the outage response engine 126. The memory 902 also stores one or more utility programs 924 that, when executed by the processing system 904, cause the computing device 900 to provide utilities to other software programs.

Embodiments of the present invention may be utilized in various distributed computing environments where tasks are performed by remote processing devices that are linked through a communications network in a distributed computing environment.

FIGS. 10A and 10B illustrate a suitable mobile computing environment, for example, a mobile computing device, a smart phone 112a, a laptop computer 112b, a tablet personal computer, and the like, with which embodiments may be practiced. The mobile computing device 1000 is illustrative of any suitable device operative to send, receive, and process wireless communications according to embodiments of the present invention. A display screen 1005 is operative for displaying a variety of information such as information about incoming and outgoing communications, as well as, a variety of data and displayable objects, for example, text, alphanumeric data, photographs, and the like.

Data input to the device 1000 may be performed via a variety of suitable means, such as, touch screen input via the display screen 1005, keyboard or keypad input via a data entry area 1010, key input via one or more selectable buttons or controls 1015, voice input via a microphone 1018 disposed on the device 1000, photographic input via a camera 1025 functionality associated with the mobile computing device, or any other suitable input means. Data may be output via the device 1000 via any suitable output means, including but not limited to, display on the display screen 1005, audible output via an associated speaker 1030 or connected earphone system, vibration module for providing tactile output, and the like.

Referring now to FIG. 10B, operational unit 1035 is illustrative of internal operating functionality of the mobile computing device 1000. A processor 1040 is illustrative of a general purpose computer processor for processing incoming and outgoing data and communications and controlling operation of the device and associated software applications via a mobile computing device operating system. Memory 1045 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, the user agent 114 may be stored locally on mobile computing device 1000.

Mobile computing device 1000 may contain an accelerometer 1055 for detecting acceleration, and can be used to sense orientation, vibration, and/or shock. Mobile computing device 1000 may contain a global positioning system (GPS) system (e.g., GPS send/receive functionality) 1060. A GPS system 1060 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 1050 include all required functionality, including onboard antennae, for allowing the device 1000 to communicate with other communication devices and systems via a wireless network. Radio functions 1050 may be utilized to communicate with a wireless or a WI-FI positioning system to determine the location of a device 1000.

Although described herein in combination with mobile computing device 1000, in alternative embodiments the invention may be used in combination with any number of computer systems, such as in desktop environments, laptop or notebook computer systems, multiprocessor systems, microprocessor-based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to flowcharts and/or operational illustrations of methods, systems, and computer program products according to embodiments. The functions/acts noted in the blocks may occur out of the order as shown in any flowchart or described herein with reference to the Figures. For example, two processes shown or described in succession may in fact be executed substantially concurrently or the blocks may sometimes be executed in the reverse order, depending upon the functionality/acts involved. While certain embodiments have been described, other embodiments may exist. Furthermore, although embodiments have been described as being associated with data stored in memory and other storage mediums, data may be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method of collecting information from a user of a managed network affected by an unavailable network resource, the method comprising the acts of:
   determining that a network resource in unavailable; and
   in response to determining that the network resource is unavailable:
   storing a resource identifier corresponding to the unavailable network resource;
   monitoring network traffic on the managed network, each item of network traffic sent from a sources address to a destination address;
   comparing an identifier associated with the destination address to the stored resource identifier;
   intercepting a request to access the unavailable network resource sent from a client device on the managed network when the identifier associated with the destination address matches the stored resource identifier;
   responding to the intercepted request with content from a content server on the managed network; and
   collecting and recording information associated with the intercepted request and identifying information about the user in a database.

2. The method of claim 1 characterized in that the content comprises a notification that the unavailable network resource is unavailable.

3. The method of claim 1 characterized in that the act of collecting identifying information about the user further comprises the act of capturing a client device identifier from the intercepted request.

4. The method of claim 3 characterized in that the act of collecting identifying information about the user further comprises the act of using the client device identifier to retrieve information about the user from a collection of customer information accessible by the content server.

5. The method of claim 3 characterized in that the client identifier associated with the client device is the internet protocol address of the client device making with the request.

6. The method of claim 1 further comprising the act of associating a set of compensation options with the unavailable network resource.

7. The method of claim 6 further comprising the act of receiving a selection of one of the set of compensation options sent from the client device.

8. The method of claim 7 further comprising the acts of:
   accessing account information associated with the user using the user's customer information associated; and
   updating the user's account information with the selected compensation option.

9. The method of claim 1 further comprising the acts of:
   storing the identifying information about the user in a database of affected users; and
   linking the identifying information about the user with a resource identifier associated with the unavailable network resource.

10. The method of claim 1 characterized in that the act of intercepting a request to access the unavailable network resource sent from a client device on the managed network further comprises the act of redirecting network traffic to the content server when a target resource identifier specified in the request matches a resource identifier associated with the unavailable network resource.

11. The method of claim 1 characterized in that the managed network is a network managed by an internet service provider.

12. A system for collecting information from a user of a managed network affected by an unavailable network resource, the system comprising:
   a network resource that is unavailable;
   a resource identifier stored in association with the unavailable network resource;
   an intercepted request having been intercepted from accessing the unavailable network resource in response to an identifier associated with a destination address matching the stored resource identifier of the unavailable network resource;
   a content server operable to server outage-related content upon the network resource becoming unavailable and receiving the intercepted request addressed to the unavailable network resource and collect information associated with at least one of the client device and the user operating the client device originating the request;
   an affected user database storing the information collected by the content server; and
   a network traffic monitor operable to monitor the managed network for a request addressed to the unavailable network resource and redirect the request to the content server.

13. The system of claim 12 characterized in that the network traffic monitor and the content server reside on the managed network.

14. The system of claim 12 further comprising a business support system in communication with the content server, the business support system comprising a database storing customer information about customers of the manager of the managed network.

15. The system of claim 12 characterized in that the content server identifies the unavailable network resource targeted in the request and serves a web page linked to the identified unavailable network resource in response to the redirected request.

16. The system of claim 12 characterized in that the content server identifies the unavailable network resource targeted in the request and sends content displayable on the client device and containing one or more compensation options linked to the identified unavailable network resource in response to the redirected request.

17. A computer readable storage device containing computer executable instructions which, when executed by a computer, perform a method for collecting information from a user of a managed network affected by an unavailable network resource, the method comprising the steps of:
   storing a resource identifier corresponding to a network resource that is unavailable;
   monitoring network traffic on the managed network, each item of network traffic sent from a source address to a destination address;
   comparing an identifier associated with the destination address to the stored resource identifier;
   redirecting the network traffic to a content server on the managed network when the identifier associated with the destination address matches the stored resource identifier;
   sending an outage notification displayable by a user agent running on the client device to the source address upon receiving the redirected item of network traffic at the content server; and
   recording information associated with the redirected item of network traffic in an affected user database.

18. The computer readable storage device of claim 17 further comprising the acts of:
   receiving an authorization to send an access restored notification when the requested network resource is no longer identified as being unavailable; and
   sending the access restored notification when the requested network resource is no longer identified as being unavailable.

19. The computer readable storage device of claim 17 further comprising the acts of:
   associating a set of compensation options with the stored resource identifier;
   sending the set of compensation options in content displayable by a user agent running on the client device to the source address;
   receiving a selection of a compensation option from the set of compensation options; and
   recording the selection of the compensation option with the information stored in the affected user database.

20. The computer readable storage device of claim 17 further comprising the act of sending the information stored in the affected user database to a computing device operated by a third party responsible for the requested network resource when the requested network resource is no longer identified as being unavailable.

\* \* \* \* \*